Feb. 20, 1940.  E. THYS  2,191,183
FINGER STRUCTURE AND SUPPORTING BAR FOR HOP PICKING MACHINES
Filed Jan. 25, 1938

INVENTOR.
Edouard Thys.
BY
Chas. E. Townsend.
ATTORNEY.

Patented Feb. 20, 1940

2,191,183

UNITED STATES PATENT OFFICE 2,191,183

FINGER STRUCTURE AND SUPPORTING BAR FOR HOP PICKING MACHINES

Edouard Thys, San Francisco, Calif., assignor to E. Clemens Horst Company, San Francisco, Calif., a corporation of New Jersey Application January 25, 1938, Serial No. 186,822

1 Claim. (Cl. 130—30)

This invention relates to a finger structure and supporting bar for hop picking machines.

Hop vines are grown on trellises from 12 to 18 feet high, and when the hops are ready for picking, they are cut off near the ground surface, pulled down and loaded on wagons, in which they are hauled to a central picking plant; or, if a portable picking machine is employed, of the type disclosed in my co-pending application Serial Number 49,531, filed November 13, 1935, for "Hop picking machine", the vines are merely dragged over to the portable machine and fed to it.

A hop picking machine, whether portable or stationary, embodies a considerable number of drums or belts from which V-shaped flexible wire fingers project. Vines are passed over and under the drums and/or belts, and during this passage the hops are combed out of the vines by the V-shaped wire fingers. The V-shaped fingers are constructed of spring steel wire, and are rigidly fastened in row formation on long bars constructed either of wood or metal. These bars are known as finger bars, and they are secured to the drums and belts. The combing action subjects the fingers to considerable wear and strain, and they bend and yield as the vines are combed. This continuous bending causes the fingers either to take a permanent bend or "set" with relation to the bars to which they are rigidly secured which is too flat for proper penetration of the vines and good combing or picking efficiency, or it causes crystallization of the spring steel from which the fingers are made, and consequent breakage.

The object of the present invention is generally to improve and simplify the construction and operation of the picking fingers and the mode of attaching the same to the finger bars; and further and more specifically stated, to provide a yielding connection between the fingers and the bars to which they are attached, so as to permit bending or yielding of the fingers without danger of permanent set or crystallization and breakage.

The fingers and the bars to which they are attached are shown by way of illustration in the accompanying drawing, in which Fig. 1 is a vertical cross section of a portion of a hop picking machine;

Figure 1:
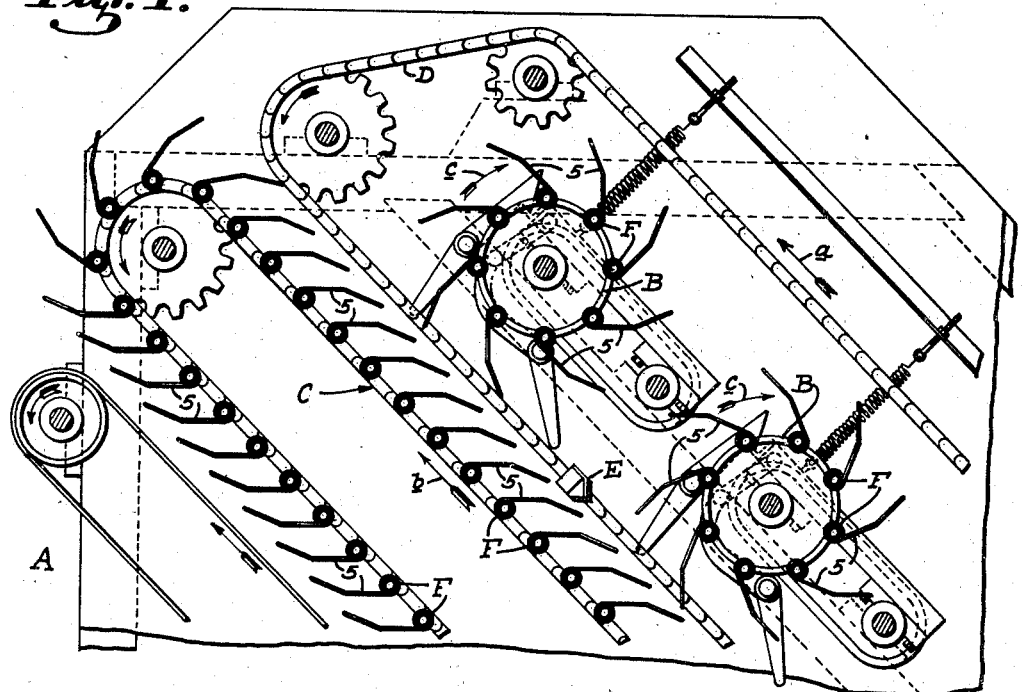
Figures 2, 3:
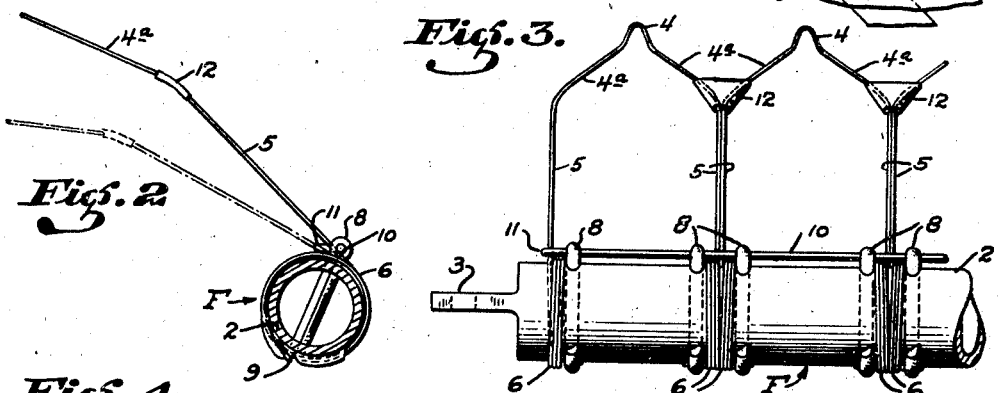
Fig. 2 is a cross section of one of the finger bars showing one of the fingers in normal picking position, and also showing the finger bent out of picking position.
Fig. 3 is a front view of a portion of a picker bar with the fingers applied thereto.
Figures 4, 5:
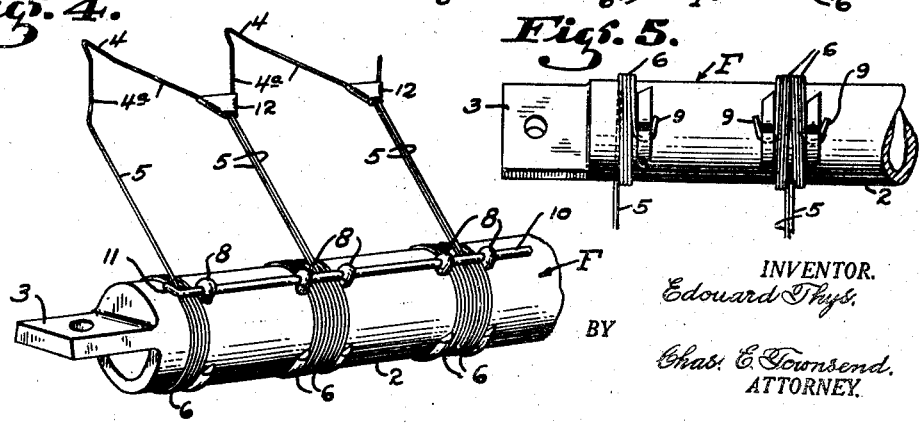
Fig. 4 is a perspective view of a portion of a picker bar with the fingers applied thereto.
Fig. 5 is a rear view of the bar shown in Fig. 3.

Referring to the drawing in detail, and particularly to Fig. 1, A indicates a main frame on which is mounted a pair of picking drums B—B and a picking belt C. Adapted to travel between the drums and the belt is a pair of endless sprocket chains D, and secured thereto at intervals are vine grasper bars E to which the hop vine to be picked is secured. The chains carrying the grasper bars are traveling in the direction of arrow $a$, and as the vine is pulled between the belt C and the drums B the fingers will comb the vines and remove the hops; that is, at the same time that the vine travels in the direction of arrow $a$, belt C will travel in the direction of arrow $b$, and the drums will rotate in the direction of arrow $c$. Hence the vines will be thoroughly combed by the fingers, and substantially all the hops will be removed.

The picking fingers are constructed of spring steel wire and are substantially V-shaped. They are secured in row formation to bars such as indicated at F, and these bars are in turn secured to the drums B and to the conveyor C. The bars will vary in length depending on the size of the machine, but in most instances they will be at least five feet or more in length.

The finger bars forming the subject matter of the present application are best illustrated in Figs. 2 to 5 inclusive. They are constructed of metal tubing as indicated at 2, and their ends are flattened to form lugs 3 whereby they may be bolted or otherwise secured to the chains forming the conveyor C, or to flanges formed in the ends of the drums B. The bars or tubes are drilled completely through at spaced intervals throughout their length, to receive a plurality of cotter pins which will serve a purpose hereinafter to be described.

Each picking finger is formed from spring steel wire of a predetermined length. This wire is bent upon itself to form a V-shaped finger 4 and a pair of arms 5—5, the ends of which are wound about a mandrill to form a pair of coil springs 6—6, said coils being sufficiently large to permit them to be readily slipped over the ends of the tubular bars F and to permit the bars to coil and uncoil as the finger arms 5—5 yield during the combing or picking operation. There are two V's formed in each picking finger: the broad or spread-out V-shaped portion 4a and the contracted outer V-shaped portion 4.

In actual operation the fingers are assembled

Feb. 20, 1940.  F. F. VOORHEIS  2,191,184
TOY WAGON
Filed May 20, 1939
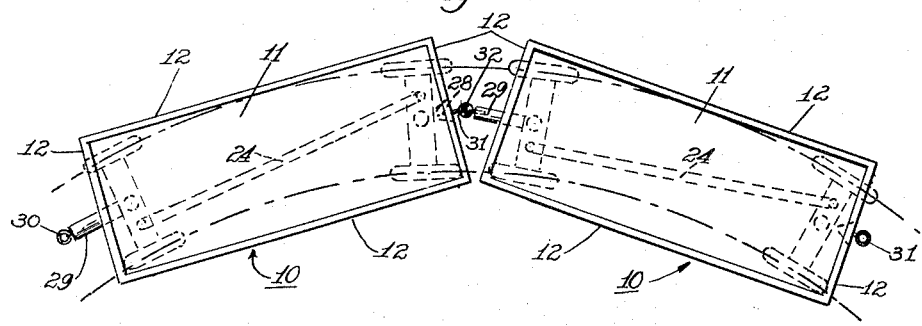
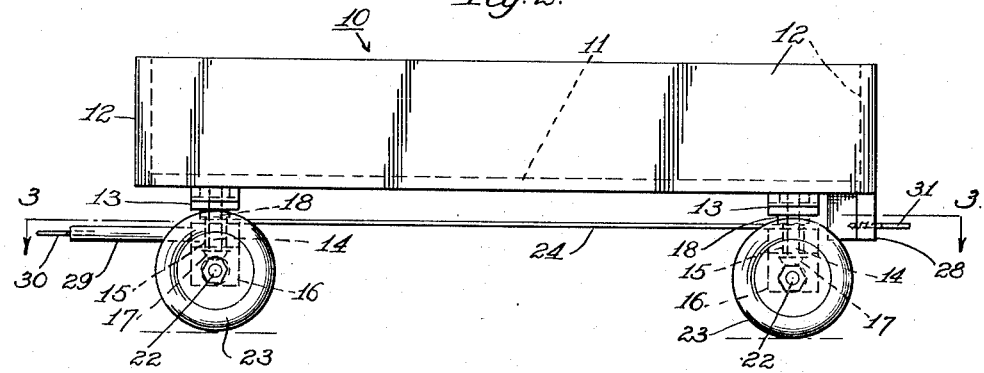
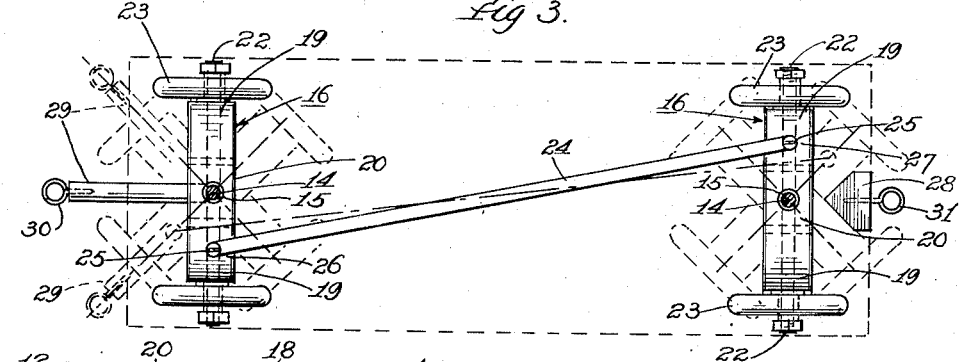
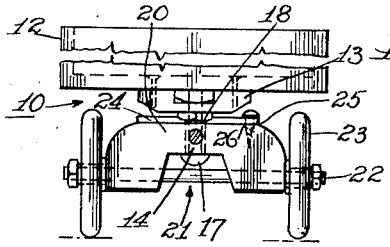
Inventor
Frank F. Voorheis.
by James R. McKnight
his Attorney